(12) United States Patent
Kormos

(10) Patent No.: US 10,277,016 B2
(45) Date of Patent: Apr. 30, 2019

(54) HAND-HELD CABLE COATING DEVICE

(71) Applicant: HeartWare, Inc., Miami Lakes, FL (US)

(72) Inventor: Michael Andrew Kormos, Pittsburgh, PA (US)

(73) Assignee: HeartWare, Inc., Miami Lakes, FL (US)

(*) Notice: Subject to any disclaimer, the term of this patent is extended or adjusted under 35 U.S.C. 154(b) by 0 days.

(21) Appl. No.: 15/697,013

(22) Filed: Sep. 6, 2017

(65) Prior Publication Data

US 2018/0076601 A1  Mar. 15, 2018

Related U.S. Application Data

(60) Provisional application No. 62/393,826, filed on Sep. 13, 2016.

(51) Int. Cl.
| *B43M 1/02* | (2006.01) |
| *A47L 13/32* | (2006.01) |
| *H02G 1/16* | (2006.01) |
| *H01B 19/04* | (2006.01) |
| *H02G 15/00* | (2006.01) |

(52) U.S. Cl.
CPC .............. *H02G 1/16* (2013.01); *H01B 19/04* (2013.01); *H02G 15/003* (2013.01)

(58) Field of Classification Search
CPC .................................. H02G 1/16; H01B 19/04
See application file for complete search history.

(56) References Cited

U.S. PATENT DOCUMENTS

| 4,511,415 | A | 4/1985 | Dienes |
| 7,307,219 | B1 | 12/2007 | Dower et al. |
| 9,475,237 | B2 * | 10/2016 | Ridout .................... B29C 73/10 |
| 2009/0260736 | A1 | 10/2009 | Charette |

FOREIGN PATENT DOCUMENTS

| GB | 1086983 A | 10/1967 |
| GB | 2015922 A * | 9/1979 .............. B29C 47/02 |

OTHER PUBLICATIONS

International Search Report and Written Opinion dated Dec. 11, 2017 for corresponding International Application No. PCT/US2017/050274; International Filing Date: Sep. 6, 2017 consisting of 12-pages.

* cited by examiner

*Primary Examiner* — Jennifer C Chiang
(74) *Attorney, Agent, or Firm* — Christopher & Weisberg, P.A.

(57) ABSTRACT

A hand-held apparatus for repairing a defect in an outer jacket of an elongated wire or cable includes a portable die and a source of a settable material. The die has a first portion connected by a hinge to a second portion. They cooperatively define a channel in a closed configuration. The source is connected to the channel through an opening between the inlet and outlet. A heating element is adapted to heat the settable material into a flowable condition and a control circuit is adapted to vary the supply of heat. The die is juxtaposed around the jacket near the defect. As the settable material is introduced into the channel, the wire or cable is moved along the channel relative to the die in the closed configuration such that a coating is formed over the defect. When the die is removed, the settable material sets into a solid condition.

7 Claims, 5 Drawing Sheets

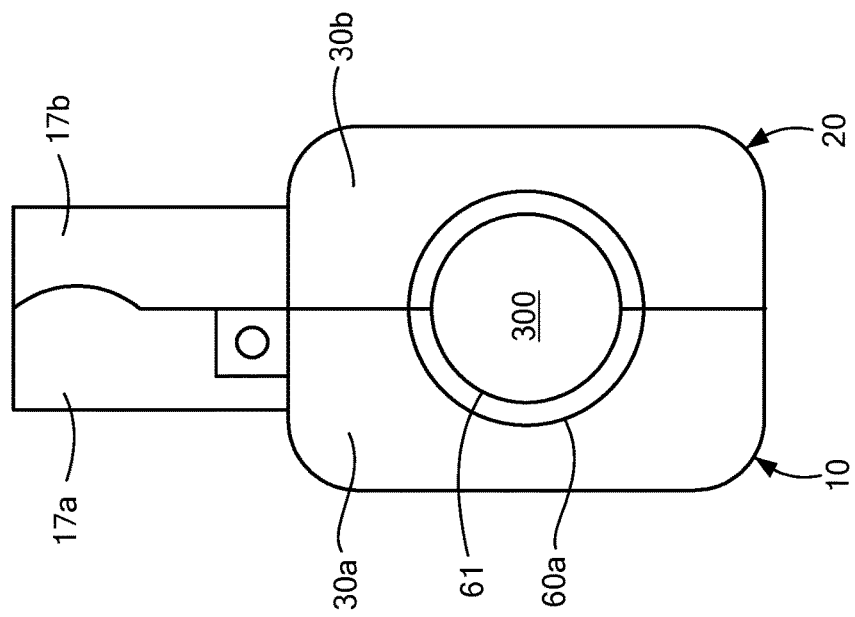
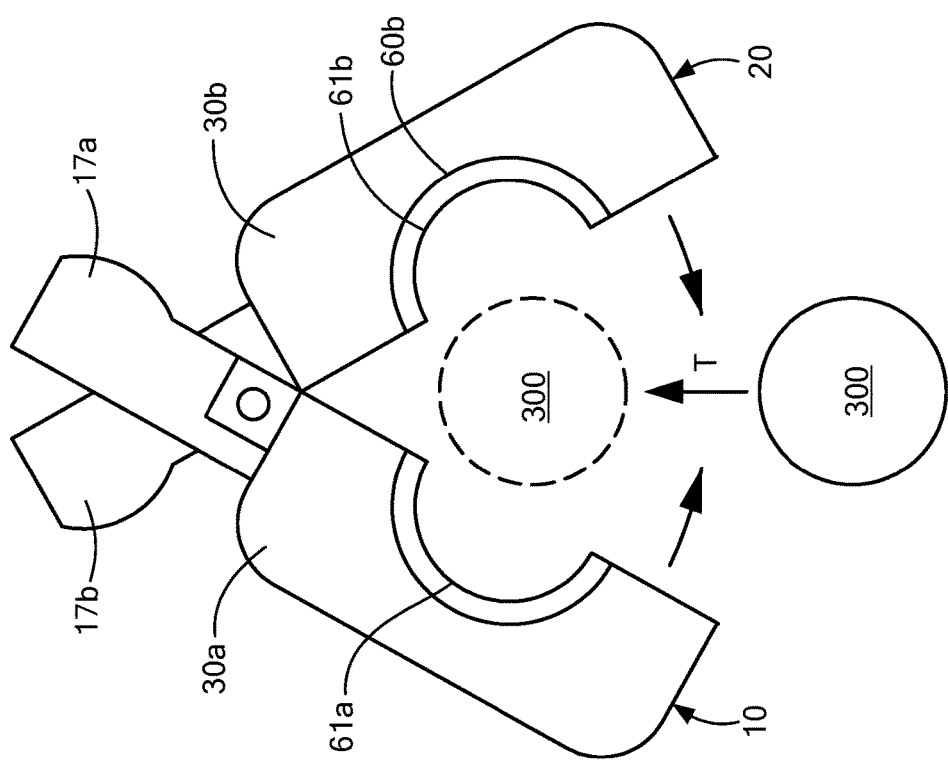

HAND-HELD CABLE COATING DEVICE

CROSS-REFERENCE TO RELATED APPLICATION

This application is related to and claims priority to U.S. Provisional Patent Application Ser. No. 62/393,826, filed Sep. 13, 2016, entitled HAND-HELD CABLE COATING DEVICE, the entirety of which is incorporated herein by reference.

STATEMENT REGARDING FEDERALLY SPONSORED RESEARCH OR DEVELOPMENT n/a

TECHNICAL FIELD

The present invention relates to improved techniques and tools for repairing cable jackets and wire insulation.

BACKGROUND

Power, control and communication cables typically are provided with an outer coating, sometimes referred to as a "jacket". For example, some cables include multiple individual wires, each covered by electrical insulation, and a jacket surrounding all of the individual wires. If a defect develops in the jacket, it may be necessary to repair or replace the cable. In some situations, it is undesirable or impractical to replace or splice the cable. For example, implanted medical devices such as mechanical circulatory support devices ("MCSDs") typically incorporate elements such as an electrically-powered pump, a controller and a percutaneous or transcutaneous connection to an external power source. These elements typically are connected to one another by cables. If a pump is disposed within the body as, for example, within the thoracic cavity, a major surgical procedure would be necessary to replace a cable extending to the pump. Moreover, where the device is providing life support to a patient, replacing or splicing the cable may require additional procedures to provide alternative life support during the procedure.

Heat-shrink tubing, which contracts from a large diameter to a smaller diameter when warmed has been used to repair cable jackets. The process allows the heat-shrink tubing to wrap tightly around and form a coating over defect in the jacket. However, it is typically necessary to disconnect one end of the cable to slip the heat-shrink tubing over the cable. Moreover, it may also be necessary to remove a connector from the end of the cable to allow passage of the tubing.

Technicians have repaired defects in cable jackets by wrapping the affected area in tape. For example, where a cable is implanted in the body, a defect in the jacket may be repaired by exposing the affected area of the cable and wrapping the cable in a tape such as a silicone rubber tape. However, the procedure is time-consuming and dependent on the skill of the technician. Moreover, it does not re-create the smooth surface of the original cable jacket. Similar problems arise where defects occur in the individual insulating jackets on single-conductor insulated wires.

SUMMARY

In one embodiment of the invention, a hand-held apparatus for repairing a defect in an outer jacket of an elongated wire or cable includes a portable die having a first portion and a second portion forming a closed configuration. The first portion and the second portion cooperatively define a channel having an inlet at an upstream end, an outlet at a downstream end, and a downstream direction from the inlet to the outlet. The first portion and the second portion are movable relative to one another to an open configuration. The first portion and the second portion are remote from one another in a direction transverse to the downstream direction. A source of a settable material in a flowable condition is in communication with the channel.

In another aspect of this Embodiment, at least one from the group consisting of the first portion and the second portion defines an opening communicating with the channel between the upstream and downstream ends, the source of the settable material communicating with the channel through the opening.

In another aspect of this Embodiment, at least one from the group consisting of the first portion and the second portion includes an adjustable portion, the adjustable portion being configured to vary at least one dimension of the channel transverse to the downstream direction.

In another aspect of this Embodiment, the upstream inlet comprises a plurality of internal guides configured to center a position of the jacket within the die.

In another aspect of this Embodiment, the first portion and the second portion are connected by a hinge.

In another aspect of this Embodiment, the apparatus further includes at least one heating element in thermal communication with at least one from the group consisting of the die and the source of the settable material.

In another aspect of this Embodiment, the apparatus further includes a control circuit configured to vary a temperature of the at least one heating element.

In another aspect of this Embodiment, the heating element is an electrical heating element, and wherein the apparatus further includes at least one battery electrically connected to the heating element.

In another Embodiment, a method of repairing a defect in an outer jacket of a wire or cable including positioning a die with the outer jacket at a location adjacent to the defect. A flowable settable material is introduced into the die. One from the group consisting of the wire and cable is moved relative to the die in a lengthwise direction and maintaining the die in proximity to the jacket. The die is removed and the settable material is set to a solid condition.

In another aspect of this Embodiment, positioning the die with the jacket includes placing one of the wire and cable between portions of the die when the portions of the die are remote from one another to form an open configuration, and then moving the portions towards one another in a direction transverse to the lengthwise direction of one of the wire and cable to form a closed configuration.

In another aspect of this Embodiment, introducing the flowable settable material includes introducing the flowable settable material into the channel at the upstream end.

In another aspect of this Embodiment, introducing the flowable settable material includes introducing the settable material into the channel between the upstream and downstream ends.

In another aspect of this Embodiment, moving the die relative to one of the wire and cable includes moving one of the one and cable through the channel from an upstream end to a downstream end of the channel.

In another aspect of this Embodiment, removing the die includes moving the portions of the die relative to one another towards the open configuration.

In another aspect of this Embodiment, the flowable settable material is a thermoplastic.

In another aspect of this Embodiment, setting the flowable settable material is performed by cooling the thermoplastic.

In another aspect of this Embodiment, the method further includes coating the defect with silicon oil.

In another aspect of this Embodiment, the method further includes wrapping the defect with tape.

In yet another Embodiment, a hand-held apparatus for repairing a defect in an outer jacket of an elongated wire or cable includes a portable die having a first portion and a second portion forming a closed configuration. The first portion and the second portion cooperatively define a channel having an inlet at an upstream end, an outlet at a downstream end, and a downstream direction from the inlet to the outlet. The first portion and the second portion are movable relative to one another to an open configuration. The first portion and the second portion are remote from one another in a direction transverse to the downstream direction, and at least one from the group consisting of the first portion and the second portion includes an adjustable portion, the adjustable portion being configured to vary at least one dimension of the channel transverse to the downstream direction. The inlet at the upstream end includes a plurality of internal guides configured to center the position of the jacket within the die. A source of a settable material in a flowable condition is in communication with the channel. At least one heating element is in thermal communication with at least one from the group consisting of the die and the source of the settable material.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIGS. 4A and 4B are a cross sectional views of the first embodiment of the hand-held cable coating device from the upstream end, in different operating conditions.

DETAILED DESCRIPTION

Figure 1:
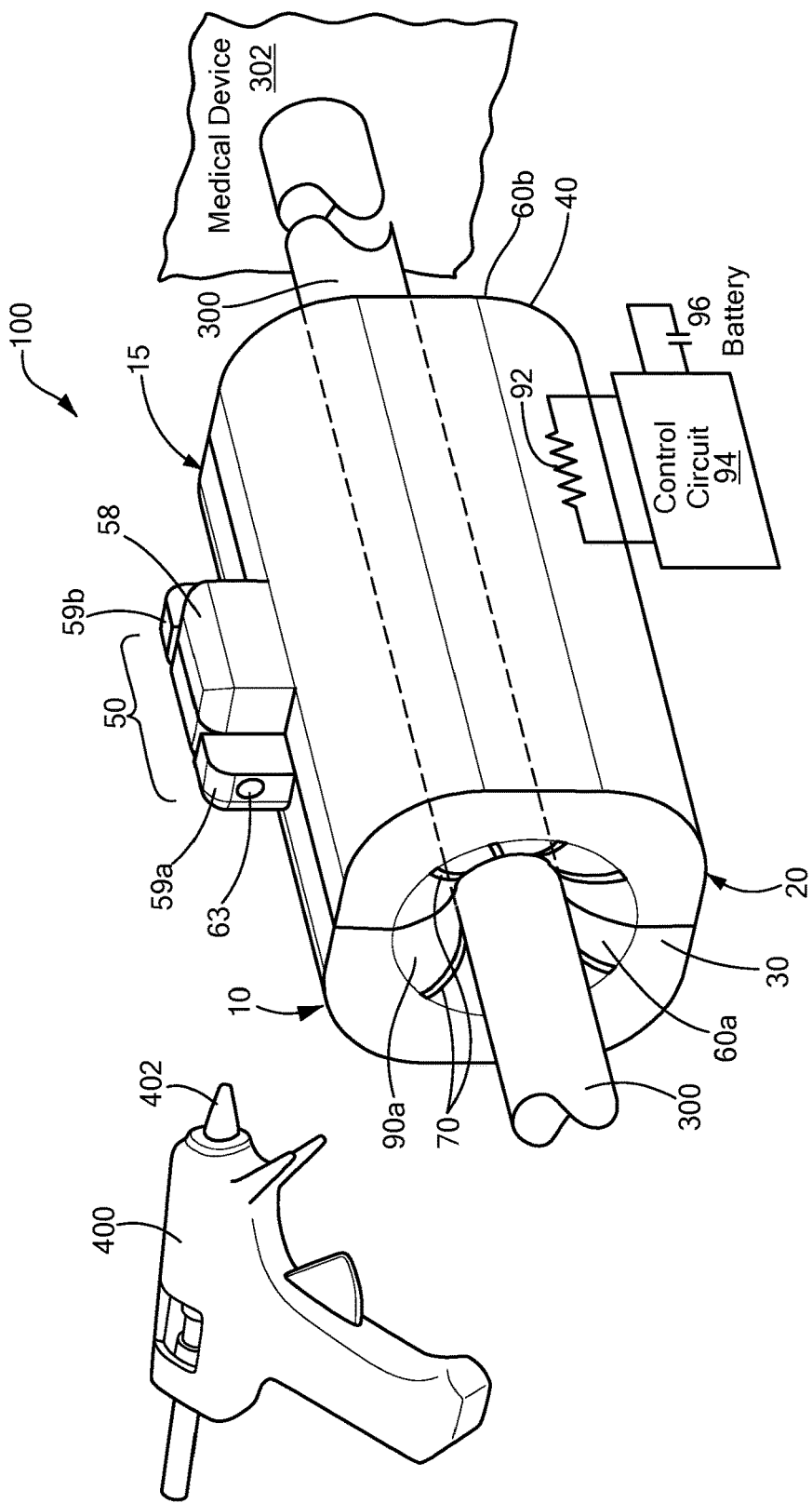
FIG. 1 shows a perspective view of a first embodiment of the hand-held cable coating device.
Figure 2:
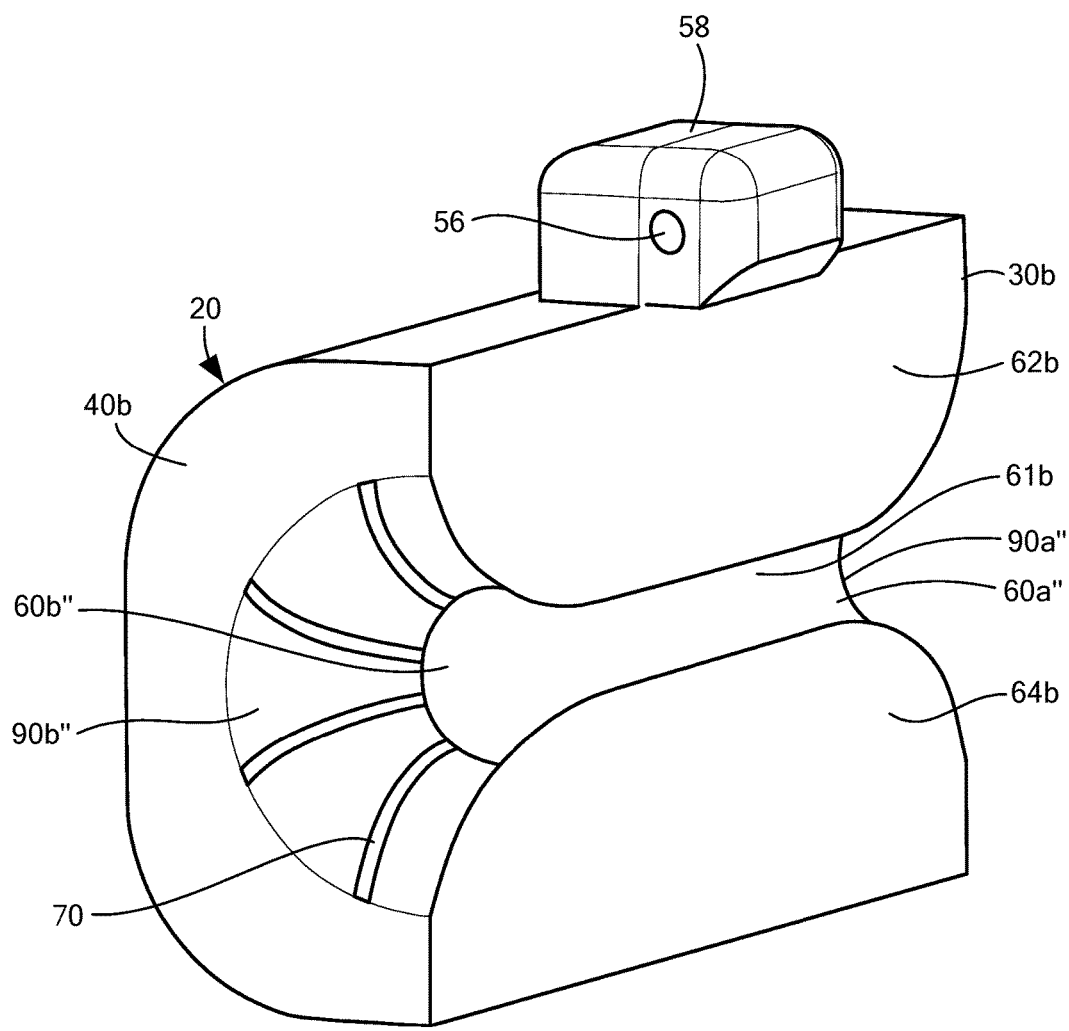
FIG. 2 shows a perspective view of the second portion of the first embodiment of the hand-held cable coating device.
Figure 3:
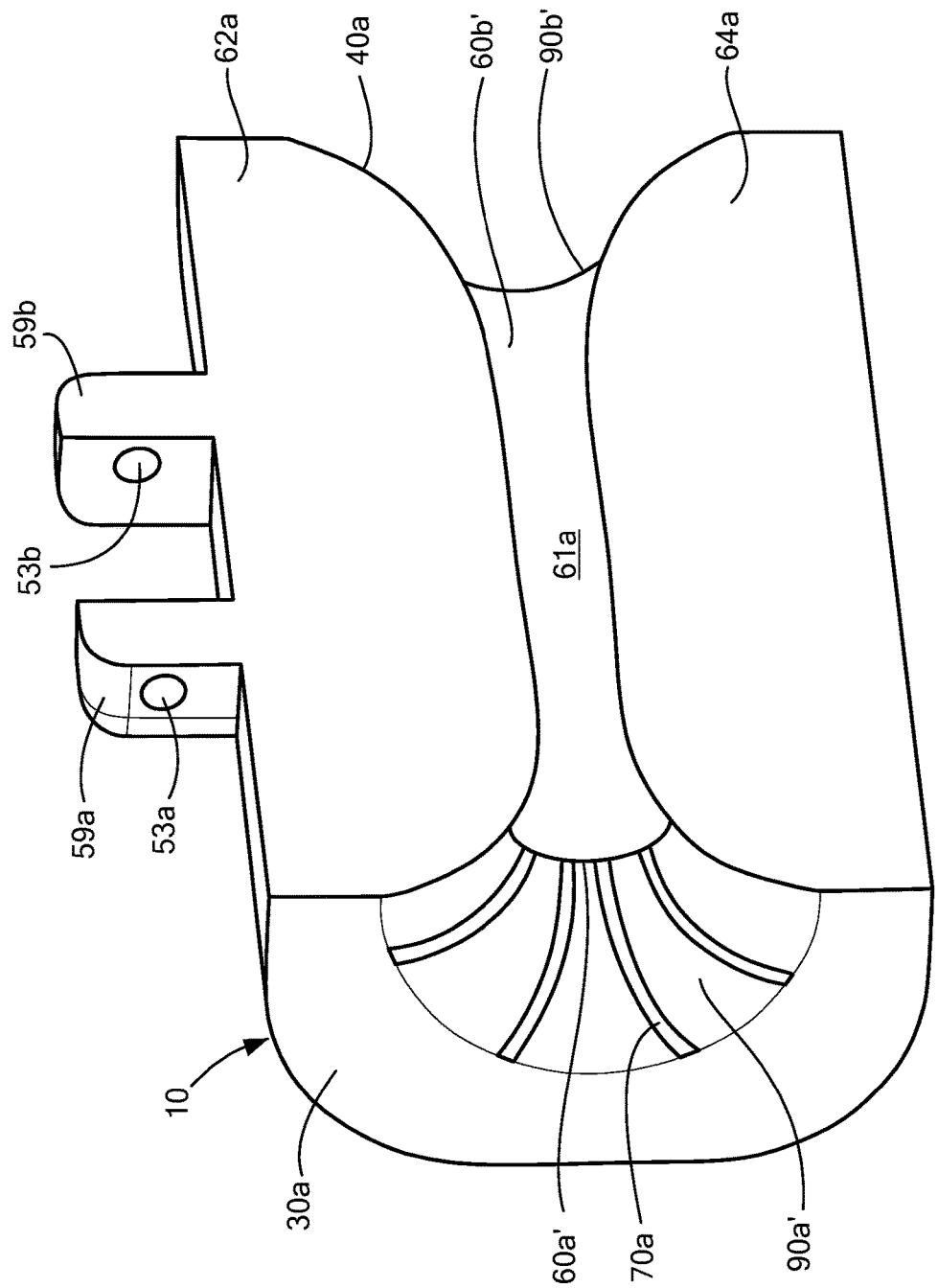
FIG. 3 shows a perspective view of the first portion of the first embodiment of the hand-held cable coating device.

Referring to the drawings, as shown in the first exemplary embodiment of FIG. 1, hand-held cable-coating device 100 includes a die 15 having two portions 10 and 20. Referring to FIG. 3, first portion 10 of die 15 includes a block, made of a material such as but not limited to a metal or metallic alloy such as steel. The block defines an inlet face 30a and outlet face 40a, and a semi-cylindrical channel 61a extending in an upstream-to-downstream or lengthwise direction through the inlet and outlet faces. The semi-cylindrical channel 61a has an inlet 60a' flaring outwardly away from the axis of the channel at an upstream end 90a' and joining with inlet face 30a. The semi-cylindrical channel 61a has an outlet 60b' flaring outwardly away from axis of the channel at a downstream end 90b' and joining with outlet face 40a. First portion 10 has a planar face 62a above the channel 61a and a planar face 64a below the channel 61a, and each planar face aligns with the corresponding planar faces 62b and 64b of second portion 20 of device 100 (see FIG. 2). Internal guides 70 in the form of ribs are provided within the inlet 60a' and the outlet 60b'. The top of first portion 10 includes side hinge elements 59a and 59b projecting upwardly transverse to the axis of the channel. Cylindrical holes 53a and 53b extend through hinge elements along a common longitudinal axis, parallel to the axis of the channel, such that a hinging element, such as but not limited to a screw or pin, can pass through them.

The second portion 20 is essentially a mirror image of the first portion. The second portion 20 shown in FIG. 2 is reversed from the position shown in FIG. 1. The second portion 20 has an inlet face 30b, outlet face 40b and semi-cylindrical channel 61b extending in an upstream-to-downstream or lengthwise direction through the inlet and outlet faces. The semi-cylindrical channel 61b has an inlet 60a" flaring outwardly away from the axis of the channel at upstream end 90a" and joining with inlet face 30b. The semi-cylindrical channel 61b has an outlet 60b" flaring outwardly away from the axis of the channel at downstream end 90b" and joining with outlet face 40b. The second portion 20 has a planar face 62b above the channel 61b and planar face 64b below the channel 61b, and each planar face aligns with the corresponding planar faces 62a and 64a of the first portion 10 of the device 100 (see FIG. 3). Internal guides 70 in the form of ribs are provided within the inlet 60a" and outlet 60b". The top of the second portion 20 includes a central hinge element 58 disposed above face 62b and projecting upwardly from the plane of face 62b. The central hinge element 58 has a hole 56 extending through it, in a lengthwise direction parallel to channel 61b.

The die portions 10 and 20 are assembled with one another as shown in FIG. 1, with the central hinge element 58 of portion 20 received between the hinge elements 59a and 59b of portion 10. A hinge pin 63 extends through the holes 53a and 53b (FIG. 3) in hinge elements 59a and 59b respectively and through hole 56 in hinge element 58. Thus, the die portions 10 and 20 are pivotally connected to one another for rotational movement between a closed configuration (FIG. 1 and FIG. 4B) and an open configuration (FIG. 4A). In the closed configuration, the faces 62b and 64b of second portion 20 (FIG. 2) abut the faces 62a and 64a of first portion 10 (FIG. 3), so that the semi-cylindrical channels 61a and 61b of the die portions cooperatively form a closed cylindrical channel 60 extending between the inlet face 30 and the outlet face 40. This closed channel has a tapered inlet 60a at the inlet face 30 and a tapered outlet 60b at the outlet face 40. Preferably, the channel has a minimum diameter approximately equal to, or slightly larger than, the outside diameter of the cable or wire jacket to be treated.

In the open configuration, portions 10 and 20 are attached to each other at hinge 50 and spaced apart from each other at an angle. A pair of handles 17a and 17b are fixed to the die portions 10 and 20, respectively, so that an operator can move the die portions to the open configuration (FIG. 4A) by spreading the handles apart and can move the die portions to the closed configuration (FIG. 4B) by squeezing the handles together.

The device 100 according to this embodiment further includes a source of a settable material. In this embodiment, the settable material is a thermoplastic, and the source of settable material includes a dispenser 400 having an internal heating element (not shown) and internal temperature control circuit (not shown) for bringing the settable material into a molten, flowable condition. Dispenser 400 has a dispensing tip 402. Dispenser 400 may be a hand-held device. For clarity of illustration, dispenser 400 is shown on a smaller scale than the other elements in FIG. 1. The device 100 optionally further includes a heating element 92, depicted schematically in FIG. 1 such that it is in thermal communication with one or both of the die portions 10 and 20 of die 15. Heating element 92 is connected to and controlled by control circuit 94. Control circuit 94 is adapted to control the temperature of the die portions, particularly the temperature within channel 60. Heating element 92 can be an electrical component such as one or more electrical resistance elements embedded in one or both die portions. The resistance heaters and control circuit can be connected to an external source of power or to a battery 96.

The device 100 can be used in a method of repairing a defect in an outer jacket of an elongated wire or cable 300. The die 15 is placed around the jacket of the cable, such as by bringing the die portions 10 and 20 to the open configuration (FIG. 4A) in which the die portions are remote from one another, and advancing cable 300 into the die in a direction T transverse to the length of the cable. Once the cable is aligned with the semi-cylindrical channels 61*a* and 61*b* in the die portions, the die portions are brought to the closed configuration (FIG. 4B) so that the cable is positioned within the cylindrical channel 61 defined by the die and cable extends through the die from the upstream or inlet end 30 to the downstream or outlet end 40. Desirably, these steps are performed so as to place the die around an undamaged section of the cable close to the damaged area of the cable jacket, with the downstream end of the die facing the damaged area.

A settable material, such as but not limited to an insulating material, is introduced into the die 15 in a flowable condition. In the embodiment of FIGS. 1-4B, the settable material is introduced into the inlet 30 at the upstream end of the channel, by placing the dispensing tip 402 of dispenser 400 in or near the inlet and in juxtaposition with the cable. As the settable material flows into the die and through the channel inside it, the cable is moved relative to the die along its length, such as by pulling the cable through the die, by holding the cable in position and advancing the die along the cable, or a combination of these actions, while maintaining the die in the closed position and thus in close proximity to the cable jacket. These actions are performed so that the cable moves through the die 15 from the upstream end 30 towards the downstream end 40. Stated another way, the die advances along the cable to and past the damaged area of the jacket. The settable material forms a coating over the damaged area of the jacket, and may also coat a portion of the undamaged area. After the damaged area has passed through the die and the coating has been formed, the die is removed from the coating on the jacket by bringing the die portions 10 and 20 to the open configuration (FIG. 4A), and moving the wire or cable out of the die in a direction transverse to its length, i.e., in the direction opposite to arrow T in FIG. 4A. During or after the coating operation, the settable material sets into a solidified condition over the defect on the jacket. For example, where the settable material is a thermoplastic, the material sets as the wire or cable exits from the die and cools. Desirably, the settable material joins with the material of the jacket to form a smooth and continuous repaired jacket which provides an effective seal around the cable.

The step of juxtaposing the die with the jacket at a location near the defect in the jacket and the step of removing the jacket from the die may both be performed at locations that are remote from the ends of the cable. The ends of the cable may remain connected to other apparatus, such as to one or more devices 302 (FIG. 1) while the defect in the jacket is repaired using the device.

Figure 5:
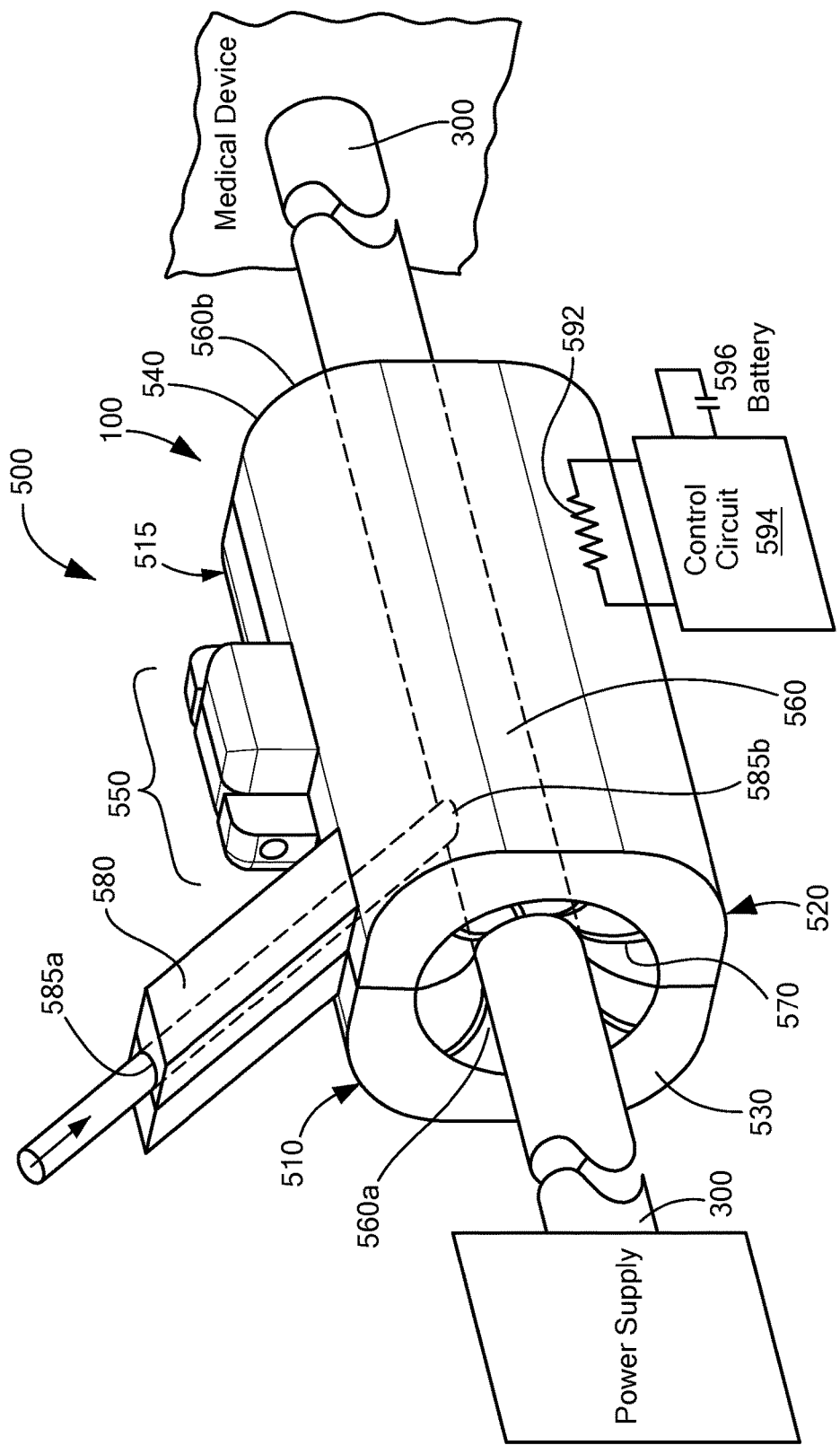
FIG. 5 is a perspective view of a second embodiment of the hand-held cable coating device.

A device 500 shown in FIG. 5 is similar to the embodiment discussed above. Here again, device includes a die 515 having two portions 510 and 520 with are held together by a hinge 550 in the same manner as discussed above, and which can be moved between open and closed configurations as discussed above. However, in this embodiment, the die portions, when in the closed configuration, cooperatively define a material inlet conduit 580 transverse to the lengthwise direction of the cable-coating channel 560. Conduit 580 communicates with channel 560 at an opening 585*b* between the inlet 560*a* and outlet 560*b* of the channel. The device includes a heating element 592 is in thermal communication one or both of the die elements, a control circuit 594 adapted to control the temperature of heating element 592 and thus control the temperature of the die elements, and a power source 596 connected to the control circuit and heating element.

The device according to this embodiment can be used in a method similar to that discussed above. Here again, the die 515 is placed around the cable while the die elements are in the open configuration, and then brought to the closed configuration. With the die in the closed configuration, the cable is advanced through the die. In this embodiment, the settable material could be introduced into the conduit 580 through an opening 585*a* in molten form or a solid form such as a hollow sheath or thin rod of a thermoplastic polymer to facilitate melting. The material melts as it traverses conduit 580 so that the material is in a flowable condition as it enters the cable coating channel 560. Here again, the settable material forms a coating on cable 300. Where the material is introduced in the form of a hollow sheath or tube, the hollow sheath or tube may also be split or open along its length to allow it to quickly surround cable 300. Upon heating by heating element 592, the ends of the split sheath melt together to tightly seal the defect in the jacket. In this manner, as the coated cable emerges out of outlet 560*b*, the setting material sets evenly onto the defective jacket of cable 300.

Numerous variations and combinations of the embodiments discussed above can be used. Typically, the die is made in different sizes for coating wires or cables of different diameters. In a variant, the die portions can include an adjustable elements located between the upstream and downstream ends in each of the two portions of the device. The adjustable elements may define the minimum diameter of the channel which receives the wire or cable, so that the minimum diameter of the channel can be varied for use with wires or cables of different sizes.

In the embodiments discussed above, the channel in the die has a circular cross-sectional shape when the die elements are in the closed configuration. However, the channel may have other shapes. Also, in the embodiments discussed above, the settable material is a thermoplastic.

Where the device is used to repair an implantable cable, the settable material desirably is a biocompatible material as, for example, a thermoplastic polymer such as those sold under the designations Carbothane and Pellethane. Use of a thermoplastic is advantageous because it typically does not require reactive chemical moieties. However, materials which cure to a solid condition by chemical reaction can be employed. For example, certain silicone and epoxy compositions can be applied in liquid form and cured by chemical reaction to a solid state. Where the settable material can be applied without heating it, the heating elements of the device discussed above can be omitted.

In the embodiments discussed above, the elements of the die are connected to one another by a hinge. In other embodiments, the elements of the die can be slidably connected to one another for movement between the open and closed configurations. In still other embodiments, the elements can be completely detachable from one another, and can be connected to one another by fasteners such as screws which can be actuated to bring the elements to the closed position.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the claims.

What is claimed is:

1. A hand-held apparatus for repairing a defect in an outer jacket of an elongated wire or cable comprising:
    a portable die having a first portion and a second portion forming a closed configuration, the first portion and the second portion cooperatively defining a channel having an inlet at an upstream end, an outlet at a downstream end and a downstream direction from the inlet to the outlet, the first portion and the second portion being movable relative to one another to an open configuration, the first portion and the second portion are remote from one another in a direction transverse to the downstream direction;
    the inlet at the upstream end includes a plurality of ribs configured to center a position of the jacket within the die; and
    a source of a settable material in a flowable condition in communication with the channel.

2. The apparatus of claim 1, wherein at least one from the group consisting of the first portion and the second portion defines an opening communicating with the channel between the upstream and downstream ends, the source of the settable material communicating with the channel through the opening.

3. The apparatus of claim 1, wherein the first portion and the second portion are connected by a hinge.

4. The apparatus of claim 1, further comprising at least one heating element in thermal communication with at least one from the group consisting of the die and the source of the settable material.

5. The apparatus of claim 4, further comprising a control circuit configured to vary a temperature of the at least one heating element.

6. The apparatus of claim 4, wherein the heating element is an electrical heating element, and wherein the apparatus further includes at least one battery electrically connected to the heating element.

7. A hand-held apparatus for repairing a defect in an outer jacket of an elongated wire or cable comprising:
    a portable die having a first portion and a second portion forming a closed configuration, the first portion and the second portion cooperatively defining a channel having an inlet at an upstream end, an outlet at a downstream end and a downstream direction from the inlet to the outlet, the first portion and the second portion being movable relative to one another to an open configuration, the first portion and the second portion are remote from one another in a direction transverse to the downstream direction, the inlet at the upstream end includes a plurality of ribs configured to center the position of the jacket within the die;
    a source of a settable material in a flowable condition in communication with the channel; and
    at least one heating element in thermal communication with at least one from the group consisting of the die and the source of the settable material.

* * * * *